(12) United States Patent
Okude et al.

(10) Patent No.: US 6,587,784 B1
(45) Date of Patent: Jul. 1, 2003

(54) STEREOSCOPIC MAP-DISPLAY METHOD AND NAVIGATION SYSTEM USING THE METHOD

(75) Inventors: Mariko Okude, Hitachi (JP); Yoshinori Endo, Mito (JP); Hideo Hiroshige, Hitachi (JP)

(73) Assignees: Hitachi, Ltd., Tokyo (JP); Xanavi Informatics Corporation, Zama (JP)

( * ) Notice: Subject to any disclaimer, the term of this patent is extended or adjusted under 35 U.S.C. 154(b) by 0 days.

(21) Appl. No.: 09/493,134

(22) Filed: Jan. 28, 2000

(30) Foreign Application Priority Data

Jan. 29, 1999 (JP) ............................................ 11-022616

(51) Int. Cl.[7] .............................................. G01C 21/00
(52) U.S. Cl. ...................................... 701/208; 348/123
(58) Field of Search ................................. 701/200, 207, 701/208, 211, 212; 340/988, 990, 995; 348/123; 345/139, 425, 422; 434/38

(56) References Cited

U.S. PATENT DOCUMENTS

| | | |
|---|---|---|
| 5,742,924 A | 4/1998 | Nakayama |
| 6,175,802 B1 * | 1/2001 | Okube et al. ............... 701/208 |

FOREIGN PATENT DOCUMENTS

| | | |
|---|---|---|
| EP | 0660290 | 6/1995 |
| EP | 0803706 | 10/1997 |
| JP | 8-292715 | 11/1996 |
| JP | 09134121 | 5/1997 |
| JP | 9-281890 | 10/1997 |

OTHER PUBLICATIONS

Copy of the search report.

* cited by examiner

*Primary Examiner*—Yonel Beaulieu
(74) *Attorney, Agent, or Firm*—Crowell & Moring LLP

(57) ABSTRACT

The view point-setting part calculates the position of the view point V to be set behind the current position of the car and up in the air, based on the current position calculated by the current position-measuring part and the position correcting part. The data reading part reads out map data M about map elements such as buildings, which are located around the current position. The representing method-changing part calculates the distance or level difference between the viewpoint and each of the map elements, and, for example, changes the representation shapes of ones of the map elements near the view point, that is, in the region within a predetermined distance from the view point, to detailed shapes, and the rest ones far from the view point, that is, outside the region within a predetermined distance from the view point, to simple shapes, respectively. Finally, the display processing part composes an image of each of the map element according to the displaying mode of the map element, which is sent from the representation method-changing part, and displays the image.

19 Claims, 16 Drawing Sheets

FIG.8A

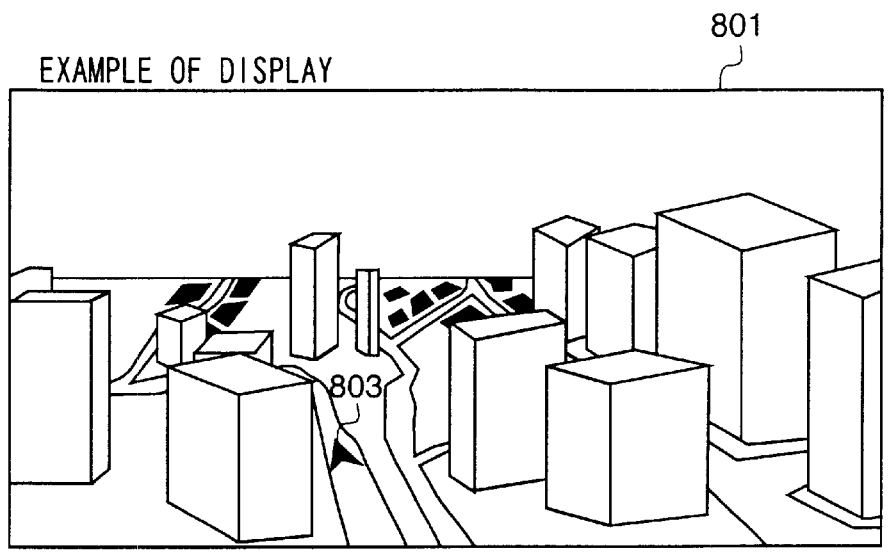

(EXAMPLE OF THE DRAWN IMAGE IN WHICH APRCHITECTURAL BODIES, THE DISTANCE BETWEEN THE VISUAL POINT AND EACH OF THE ARCHITECTURAL BODIES BEING LONGER THAN A PREDETERMINED VALUE, ARE DRAWN INTO PLANE SHAPE)

FIG.8B

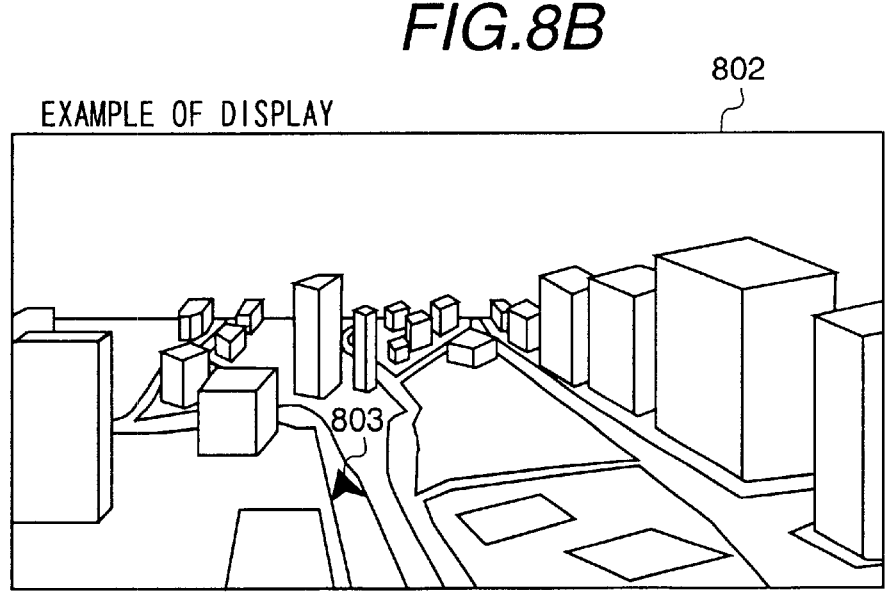

(EXAMPLE OF THE DRAWN IMAGE IN WHICH APRCHITECTURAL BODIES, THE DISTANCE BETWEEN THE VISUAL POINT AND EACH OF THE ARCHITECTURAL BODIES BEING SHORTER THAN PREDETERMINED VALUE, ARE DRAWN INTO PLANE SHAPE)

EXAMPLE OF DISPLAY

EXAMPLE OF DISPLAY

EXAMPLE OF DISPLAY

# STEREOSCOPIC MAP-DISPLAY METHOD AND NAVIGATION SYSTEM USING THE METHOD

BACKGROUND OF THE INVENTION

The present invention relates to a stereoscopic map display method, and especially to a stereoscopic map display used in a navigation system which displays roads or buildings around the car with the navigation system, or which displays an intersection by use of a perspective view from a predetermined angle with respect to the ground surface.

One of the known navigation systems, for example, a system disclosed in Japanese Patent Application Laid-Open Hei 8-292715, makes the use of a car more convenient by reading out digital map data stored in a storage medium such as a CD-ROM, a DVD, etc., and displaying buildings and roads onto a map shown on a screen, along with the directions from the current position of the car, which is determined using a position detector such as a GPS, to the target location.

In recent map data, a city-area map is stored, and detailed information such as shapes, locations, the number of floors, and so on of houses and buildings can be displayed with the city-area map. Moreover, as disclosed in Japanese Patent Application Laid-Open Hei 9-281890, some of the known navigation systems use a display method that stereoscopically displays landmark-buildings along the driving path of a car on the city map in order to intelligibly indicate a view around the car, the target location, etc., along with the views around intersections on the driving path of the car.

SUBJECTS TO BE SOLVED BY THE INVENTION

If map elements such as buildings are stereoscopically displayed, since a number of polygons expressing sides of the stereoscopically displayed map elements are necessary according to the number of the displayed map elements, the number of the necessary polygons is larger than that used in conventionally displaying the map elements in a plane.

Thus, if the amount of information to be displayed is increased by stereoscopically displaying map elements, a user must quickly find out the information necessary for the navigation of his car from a lot more displayed information. That is, simple stereoscopic displays of map elements do not always improve the intelligibility of the navigation guidance (hereafter referred to as the guiding ability) performed by a navigation system, but rather some stereoscopic displaying methods actually deteriorate the guiding ability.

Further, the increase in the number of polygons increases the image-deploying load on the navigation system.

SUMMARY OF THE INVENTION

An object of the present invention is to provide a means which is capable of improving the visibility of a displayed map, and/or reducing the image-displaying load by suppressing the increase in the amount of displayed information due to the stereoscopic displaying of map elements using a stereoscopic map display method, and a navigation system using the method, in which a stereoscopic scene viewed from a predetermined view point is displayed.

The above object of the present invention is attained by providing a representation method-changing means for changing a representation method for at least one of a specified group in the map elements and a map element possessing specified attributions.

In more detail describing, the present invention provides a stereoscopic map-display method of displaying a scene on a display screen corresponding to a perspective map generated by viewing the map elements in a displayed area, which is set based on the position of the moving body or the position designated by the user, from a predetermined view point, map information on the map element in the displayed area being read out of a map database, the stereoscopic map-display method comprising the step of changing a representation method for the map elements based on at least one of a distance in a straight line, a horizontal distance, and a level difference between the view point and each map element, and further provides a navigation apparatus for generating a map-image, using the method.

Here, in the above step of changing a representation method for map elements, (a) ones in the map elements, at least one of a distance in a straight line, a horizontal distance, and a level difference between each of the ones and the view point being larger than a predetermined value, (b) ones in the map elements, at least one of a distance in a straight line, a horizontal distance, and a level distance between each of the ones and the view point being smaller than a predetermined value, or (c) ones in the map elements, which are located between the view point and a position to be noticed, the position being set in the displayed area, are displayed using a representation method with lower visibility or lower drawing-detail degree than that used when displaying the rest ones in the map element.

Further, in the above step of changing a representation method for map elements, a representation method for the map element is changed based on at least one of height of the view point, a distance in a straight line, a horizontal distance, and a level distance between each of the ones and the visual. When changing the representation method, (a) map elements, the distance or level difference between the view point and each of the map elements being larger than a predetermined value under the condition that the height of the view point is higher than another predetermined value, (b) map elements, the distance or level difference between the view point and each of the map elements being smaller than a predetermined value under the condition that the height of the view point is higher than another predetermined value, or (c) map elements located between the view point and a position to be noticed, are displayed using a representation method with lower visibility or lower drawing-detail degree than that used when displaying the rest ones in the map element.

Furthermore, to attain the above object, the present invention provides a stereoscopic map-display method comprising the step of changing a representation method for each of the map elements based on attributions (the number of floors or the height of the building, the bottom area of the building, the type of the store, etc.) of the map element, the attributions being included in the map information, and further provides a navigation apparatus for generating a map-image, using the method.

For example, if the attributions include at least one of the number of floors, height, and a bottom area of an architectural body corresponding to the map element, in the step of changing a representation method, (a) map elements, at least one of at least one of the number of floors, the height, and the bottom area of the architectural body being smaller than a predetermined value, are displayed using a representation method with lower visibility or lower drawing-detail degree than that used when displaying the rest ones in the map element, or (b) map elements, at least one of at least one of the number of floors, the height, and the bottom area of the architectural body being larger than a predetermined value, are displayed using a representation method with higher visibility or higher drawing-detail degree than that used when displaying the rest ones in the map element.

Moreover, it is possible that (a) ones in the map elements, which possess the attribution designated by a user or the navigation apparatus itself, are displayed using a representation method with higher visibility or higher drawing-detail degree than that used when displaying ones not-designated by the control information in the map element, or that (b) map elements in the displayed area, which are not designated by a user or the navigation apparatus itself, are displayed using a representation method with lower visibility or lower drawing-detail degree than that used when displaying ones designated by the control information in the map element.

Still further, in the above step of changing a representation method, it is possible that a representation method for the map element is changed based on the attributions and the height of the view point. When changing the representation method, a representation method for the following map elements is changed: that is, (a) map elements whose the number of floors or the height, or the bottom area is smaller than a predetermined value under the conditions that the height of the view point is higher than a predetermined value, (b) map elements whose the number of floors or the height, or the bottom area is larger than a predetermined value under the conditions that the height of the view point is higher than a predetermined value, (c) (d) map elements not possessing attributes designated by a user or not corresponding to ones to be noticed for guidance under the conditions that the height of the view point is higher than a predetermined value, (e) map elements possessing attributes designated by a user or corresponding to ones to be noticed for guidance under the conditions that the height of the view point is lower than a predetermined value, or (f) map elements possessing attributes designated by a user or corresponding to ones to be noticed for guidance under the conditions that the height of the view point is lower than a predetermined value.

Furthermore, in the above step of changing a representation method, it is possible to change a representation method for map elements facing the road on which the moving body moves, or map elements located within a predetermined distance from the road.

Also, in the above step of changing a representation method, it is possible to change a representation method for map elements located within a predetermined distance from a target architectural body when the moving body comes within another predetermined distance from the target architectural body.

Further, the above object of the present invention can be attained by using a map-display apparatus for generating and displaying map image data with the above map-display method according to the present invention, or by a storage medium which stores a program for executing the above map display method according to the present invention in a computer.

Furthermore, the above object of the present invention can be attained with an apparatus for generating image data using the above map-display method according to the present invention, or with an apparatus for displaying a map based on the image data.

BRIEF DESCRIPTION OF THE DRAWINGS

FIG. 8A is an illustration depicting an example of a displayed image obtained by the processing shown in FIG. 6 or FIG. 7.

FIG. 8B is an illustration depicting another example of a displayed image obtained by the processing shown in FIG. 6 or FIG. 7.

DETAILED DESCRIPTION OF THE EMBODIMENTS

Hereafter, the embodiment according to the present invention will be explained with reference to the drawings.

Figure 1:
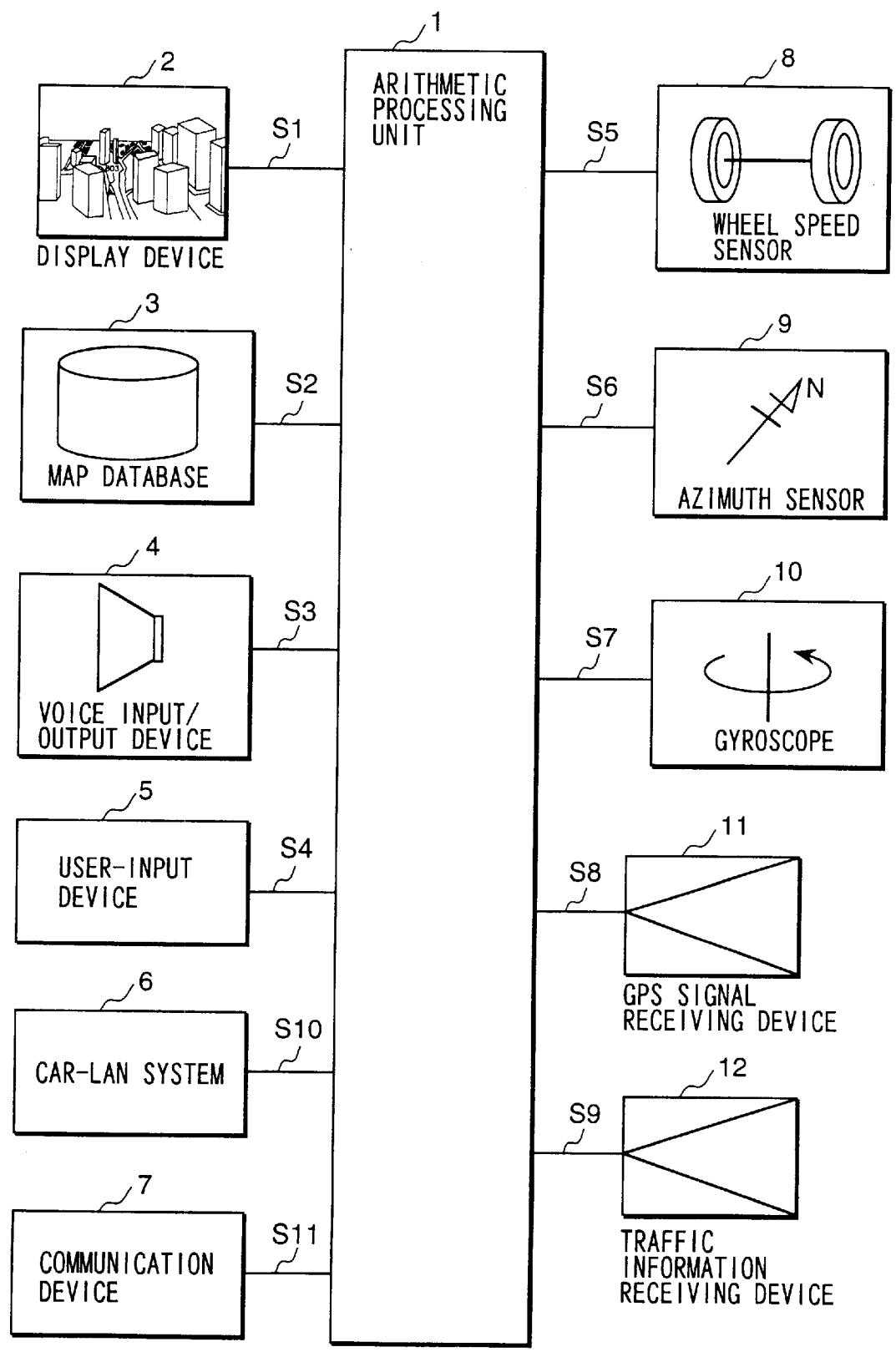
FIG. 1 is a schematic block diagram showing the composition of a navigation apparatus of an embodiment according to the present invention.

FIG. 1 shows the hardware composition of a navigation apparatus of an embodiment according to the present invention. In this navigation apparatus, the arithmetic processing unit 1 is the central unit, in which various types of information processing functions are executed. For example, the current position of a car is determined based on information sent from the various sensors 8–11, the necessary map information is read out of the map database 3, corresponding to the obtained information on the current position, and a map image is created by graphics-processing. Further, the arithmetic processing unit 1 displays a current position mark to show the current position of the car on the map image on the screen of the display device 2, calculates the optimal route connecting the current position of the car and the position (for example, the target location) designated by a user via a user-input device 5, indicates the optimal route to the user, and guides the car along the route.

The display device 2 is a unit for displaying the graphics-information generated by the arithmetic processing unit 1, and a CRT display device or a liquid crystal display device is generally used for the display device 1. Further, the signal S1 transmitted between the arithmetic processing unit 1 and the display device is generally sent and received by using an RGB signal system or an NTSC (National Television System Committee) system.

The map database 3 is stored in a storage medium with a large capacity such as a CD-ROM, an IC card, or a DVD (Digital Video Disc), and necessary map data are read from the map database.

Further, the voice input/output device 4 converts a message generated by the arithmetic processing unit 1 into voice signals, and outputs the voice signals. Also, this device 4 recognizes the user's voice, and transfers the meaningful contents of the user's voice to the arithmetic processing unit 1.

Moreover, the user-input device 5 is a device for receiving a user's instructions, and a hand switch such as a scroll key, a scale-reduction key, a joy stick, a touch panel, and so on is used for the user-input device 5.

The following sensors are used in a sensor for determining the position of a moving body, which is provided in a moving-body navigation system. They are a wheel speed sensor 8 used to calculate the running distance of the moving body using the production of the circumference length of a wheel and the number of rotations, a azimuth sensor 9 for determining the orientation of the moving body by determining the direction of the terrestrial magnetism, a gyroscope 10 such as an optical-fiber gyroscope, a vibration gyroscope, etc., a GPS signal receiving device 11 for determining the current position and the direction of motion and orientation of the moving body by measuring the distance between the moving body and each of more than three GPS satellites and a time-derivative value of each distance, and so forth.

Furthermore, the navigation apparatus includes a traffic information receiving device 12 for receiving signals sent from a radio beacon or an FM multiplex broadcasting facility which dispatches real-time information, for example, information on parking zones, information on traffic regulation such as rout changes due to road construction, road closures, traffic jam, and so on.

In addition, the navigation apparatus includes a car-LAN system 6 for receiving information on the states of various components such as open/closed signals for doors, lighting states of lights, or operational states or diagnostic results from an engine, and a communication device 7 for receiving information desired by a user from information centers, using a portable telephone, a PHS, etc.: For example, information on restaurants or hotels at any location designated by the user.

The composition of a navigation apparatus to which the present invention can be applied is not restricted to that of the above embodiment. The present invention is applicable to any navigation apparatus or any other type of apparatus which includes a map display function, as well as to the navigation apparatus of the above embodiment.

For example, if a program for executing the map-display method according to the present invention is stored in a storage medium, and the map-display method is implemented using the program, it is possible that the program stored in the storage medium is read out by a storage-medium content read-out device into the memory of a computer, and the computer then executes the program stored in the memory.

Figure 2:
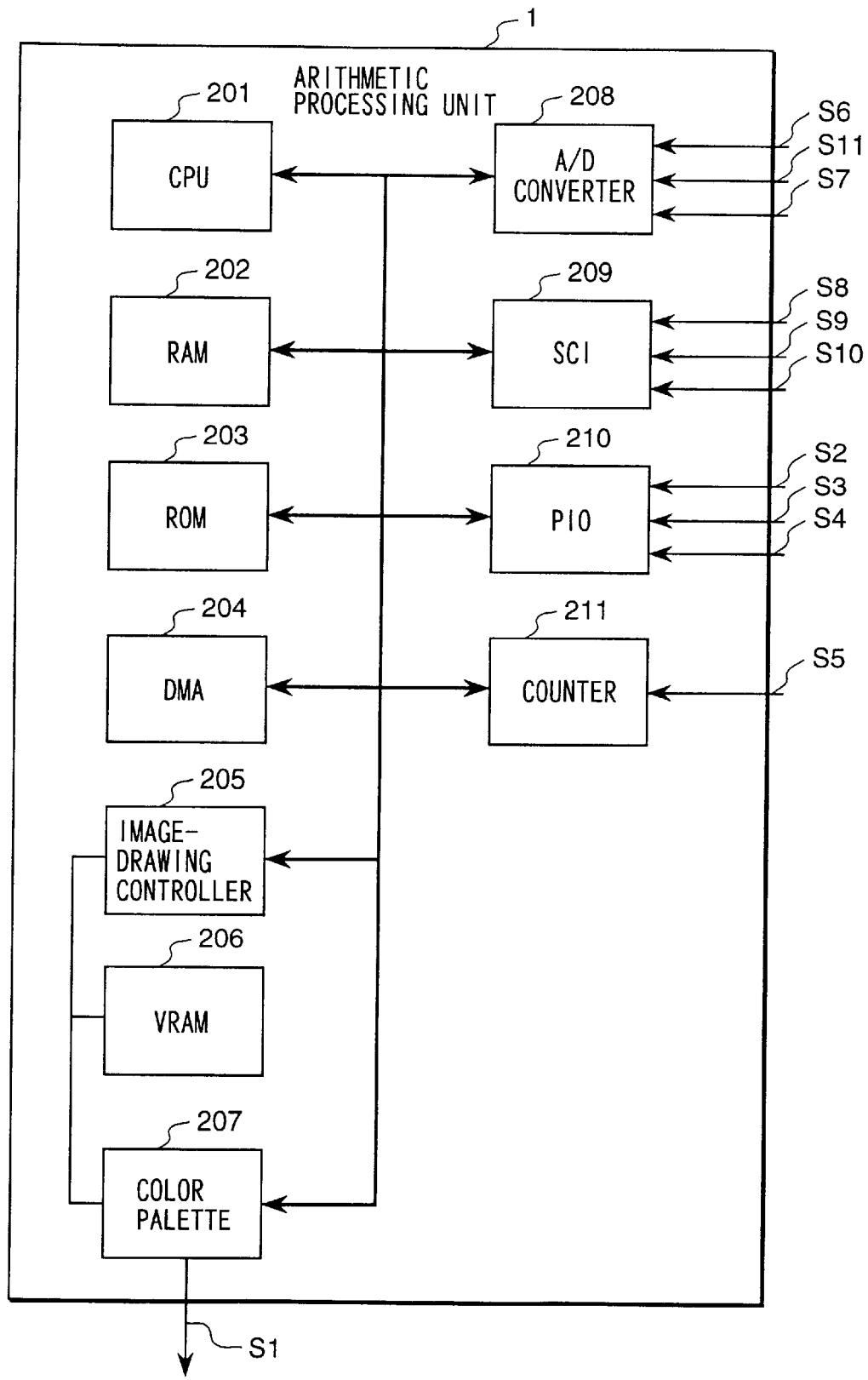
FIG. 2 is a schematic block diagram showing the hardware composition of the arithmetic processing unit 1.

FIG. 2 shows the hardware composition of the arithmetic processing unit 1. Each of the components in the unit 1 is explained below.

In the arithmetic processing unit 1, the devices composing this unit are connected to each other via a bus. The devices composing the unit 1 are a CPU 201 for executing various processing functions such as numeral calculations, controlling of each device, etc.; a RAM 202 for temporarily storing numeral data or map data; a ROM 203 for storing programs and data to implement the map-display method according to this embodiment, which will later be explained in detail; a DMA (Direct Memory Access) device 204 for performing high-speed data-transfers between memories or between each memory and each device; an image-drawing controller 205 for controlling the data write-in for a VRAM 206; a VRAM 206 for storing graphics-image-data obtained by converting vector-data to image information; a color palette 207 for converting the image data into RGB signals; an A/D converter 208 for converting an analog signal to a digital signal; a SCI device 209 for converting a serial signal to a parallel signal in synchronization with the cycle of the bus; a PIO device 210 for transferring a parallel signal onto the bus, synchronized with the timing of the conversion of the parallel signal; and a counter 211 for integrating pulse signals.

Figure 3:
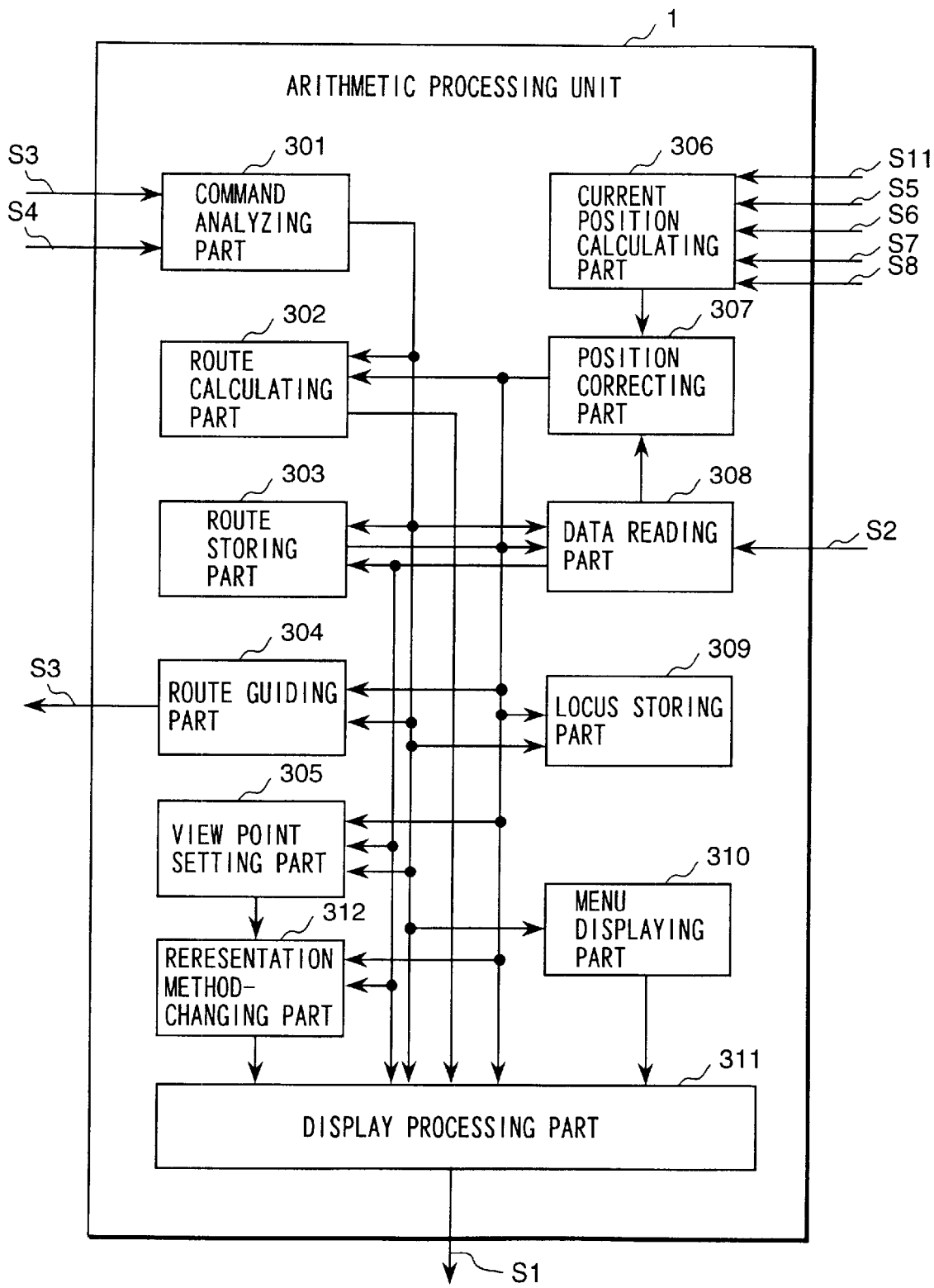
FIG. 3 is a schematic block diagram showing the functional composition of the arithmetic processing unit 1.

FIG. 3 shows the functional composition of the arithmetic processing unit 1. Each of the functions in this unit is explained below.

The current position calculating part 306 calculate the current position (X', Y') at which the moving body has arrived after it started from the initial position (X, Y) by integrating the angular speed data S7 measured by the gyroscope 10, and by using the distance data obtained by integrating the distance-pulse data S5 generated by the wheel speed sensor 8 and the angular speed data S7 measured by the gyroscope 10. Here, in order to make the direction of motion of the moving body agree with the angle by which the moving body has rotated, the correct direction of motion is obtained by correcting the angle data by which the moving body has rotated with the orientation data S6 detected by the azimuth sensor 9. Moreover, since the measurement errors from each of the above sensors will accumulate if the data measured by the sensor is integrated, the current position data is output by canceling the accumulated error with a predetermined period, using the position data obtained from the GPS signal-receiving device 11.

Since the current position data still includes the measurement errors from each sensor, correction processing is performed for the current position by the position correcting part 307 to improve the accuracy of the current position data. In this correction processing, the position correcting part 307 collates the data from the road around the current position, which are read out by the data reading part 308, and from the motion trajectory obtained by the current position calculating part 306. Further, the position correcting part 307 specifies the current position at the pertinent portion of the road, the pattern of the neighbor region of which most agrees with that of the motion trajectory. The agreement of the read-out map road including the current position and the motion trajectory can almost always be obtained. Thus, it is possible to output accurate current position information.

The current position information obtained by the above process is stored in the locus storing part 309 at each predetermined distance. The trajectory data is used to clearly indicate the road on which the moving body has passed with a trajectory mark.

Further, the navigation apparatus receives an instruction from the user via the user-input device 5. Furthermore, the command analyzing part 301 analyzes the instruction, and controls each device so as to perform the processing which corresponds to the instruction. For example, if the user requests route guidance to his target location, the command analyzing part 301 instructs the display processing part 311 to display a map used to show the target location. Moreover, if the navigation apparatus receives scroll operations carried out by the user, and/or input operations for a change in the line of vision or a reduction in scale, the command analyzing part 301 instructs the display processing part 311 to change the representation method for the displayed map in response to the above operations.

The route calculating part 302 searches for a route between two designated places based on the map data, using an algorithm such as Dijkstra Algorithm, and stores the obtained route in the route-memorization part 303. In this search for a root, it is possible to obtain a route with shortest distance, the shortest travel time, or the cheapest cost.

The route guiding part 304 compares the link information in the obtained route to be used, which is stored in the route-memorization part 303, with the current position determined by the current position calculating part 306 and the position correcting part 307, and indicates the obtained route to be used by advising the user with a voice from the voice input/output device 4 to go straight, or turn to left or right at a predetermined time before passing an intersection, or by showing the direction in which the moving body should go on the map image displayed on the screen of the display device 2.

The data reading part 308 reads the map data of the required range out of the map database 3, and stores these map data in its memory.

The view point-setting part 305 sets a view point, a line of vision, an angle of visibility, etc., to create a perspective image with respect to the region including the point to be noticed, such as the current position of the moving body (hereafter, referred to as the car), the position designated by the scroll operations, etc., which is viewed in the direction of a visual line intersecting the ground surface at a predetermined angle. In this embodiment, when the current position of the car is displayed, the view point is positioned behind the car, and a car-position mark is shown on the displayed map-image.

The display processing part 311 displays stereoscopic shapes such as architectural bodies viewed from a predetermined position. This part 311 receives the map data of the region around the place, the displaying of which map image is required, from the data reading part 308, and converts the map data into a graphics image based on the view point, the line of vision, and the angle of the visual field set in the view point-setting part, and based on the reduced scale, the displaying method, and the direction of the displaying designated in the command analyzing part 301.

The menu displaying part 310 receives an instruction output from the command analyzing part 301, transfers various type types of menus or marks which are required to the display processing part 311, and the transferred menus or marks are then superimposed on the displayed map image.

The representation method-changing part 312 generates image data used for displaying a map image including map elements such as architectural bodies, buildings, etc., which are stereoscopically displayed by the image processing method according to the present invention, and changes the representation method for each map element, corresponding to the distance or the level difference between the view point and the map element, or the attribution of the map element.

Figure 4:
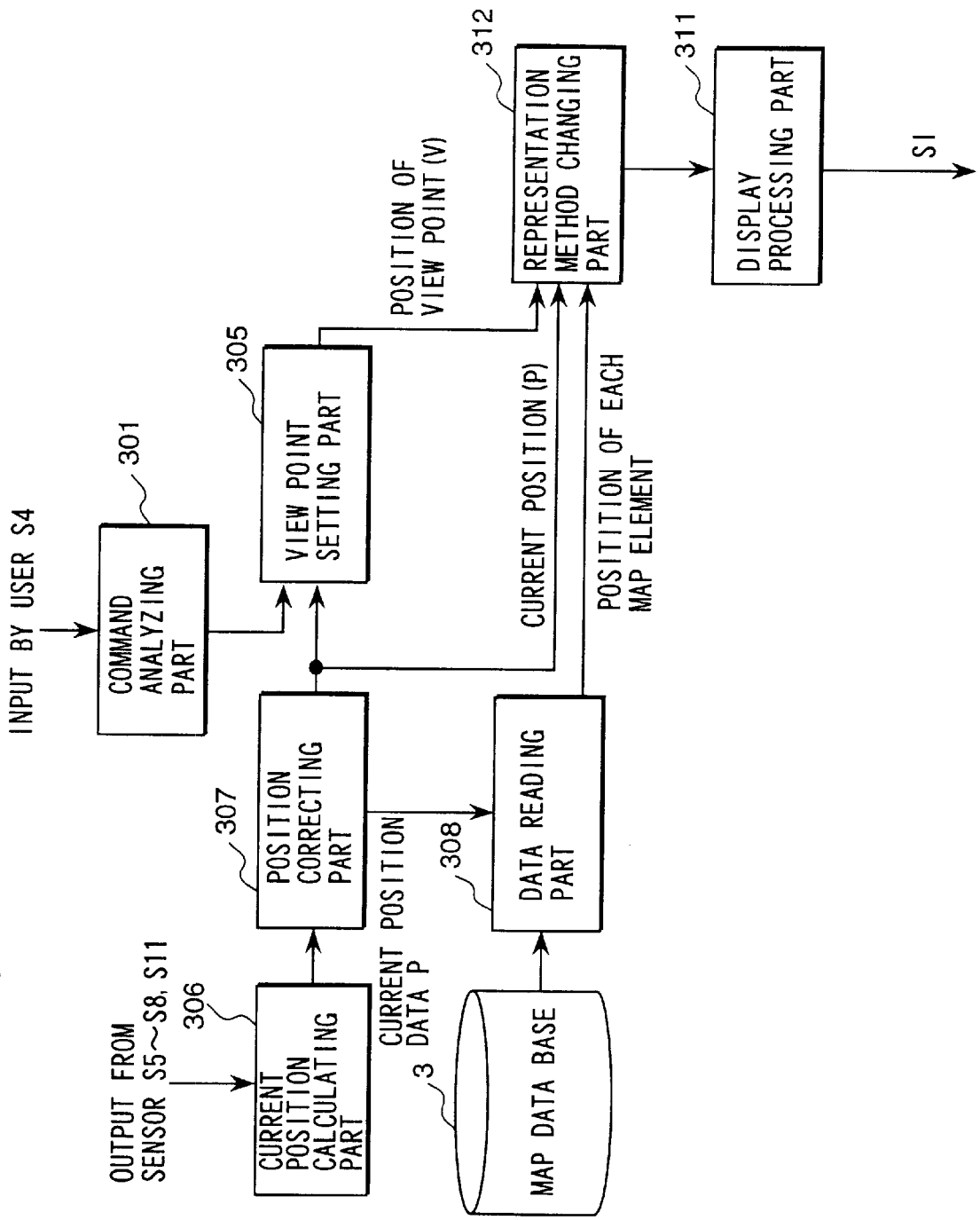
FIG. 4 is a block diagram depicting the flow of data in changing the representation method, corresponding to the positional relationship between the view point and each map element.

FIG. 4 is a block diagram depicting the flow of data when changing a representation method, which is performed by the representation method-changing part 312 in the functional composition shown in FIG. 3.

Further, in the view point-setting part 305, the position V of the view point, which is set behind the current position of the car and up in the air, is calculated based on the current position P obtained by the current position calculating part 306 and the position correcting part 307, and the user-input S4 input via the command analyzing part 301. The data reading part 308 reads the position M of each of the map elements such as buildings, which are located around the current position P.

Meanwhile, although the current position P of the car determined by the position correcting part 307 is used in this embodiment, it is possible to directly use the current position of the car calculated by the current position calculating part 306.

Also, although the current position of the car is clearly displayed on the displayed map image in this embodiment, if the position or the region to be noticed is designated by the user, the designated position or region is clearly displayed in place of the current position of the car.

The representation method-changing part 312 calculates the distance in a straight line, the horizontal distance, or the level difference between the view point V and the position M of each map element, and, for example, stereoscopically displays map elements near the view point: that is, map elements within a predetermined distance from the view point are stereoscopically displayed. Further, map elements outside the region within the predetermined distance from the view point are displayed into plane shapes. The predetermined distance is set in advance, or by the user.

The display processing part 311 composes an image of each map element whose representation method is changed by the representation method-changing part 312 based on the designated attributions such as a shape, color, texture, and so on applied to the map element.

Figure 5:
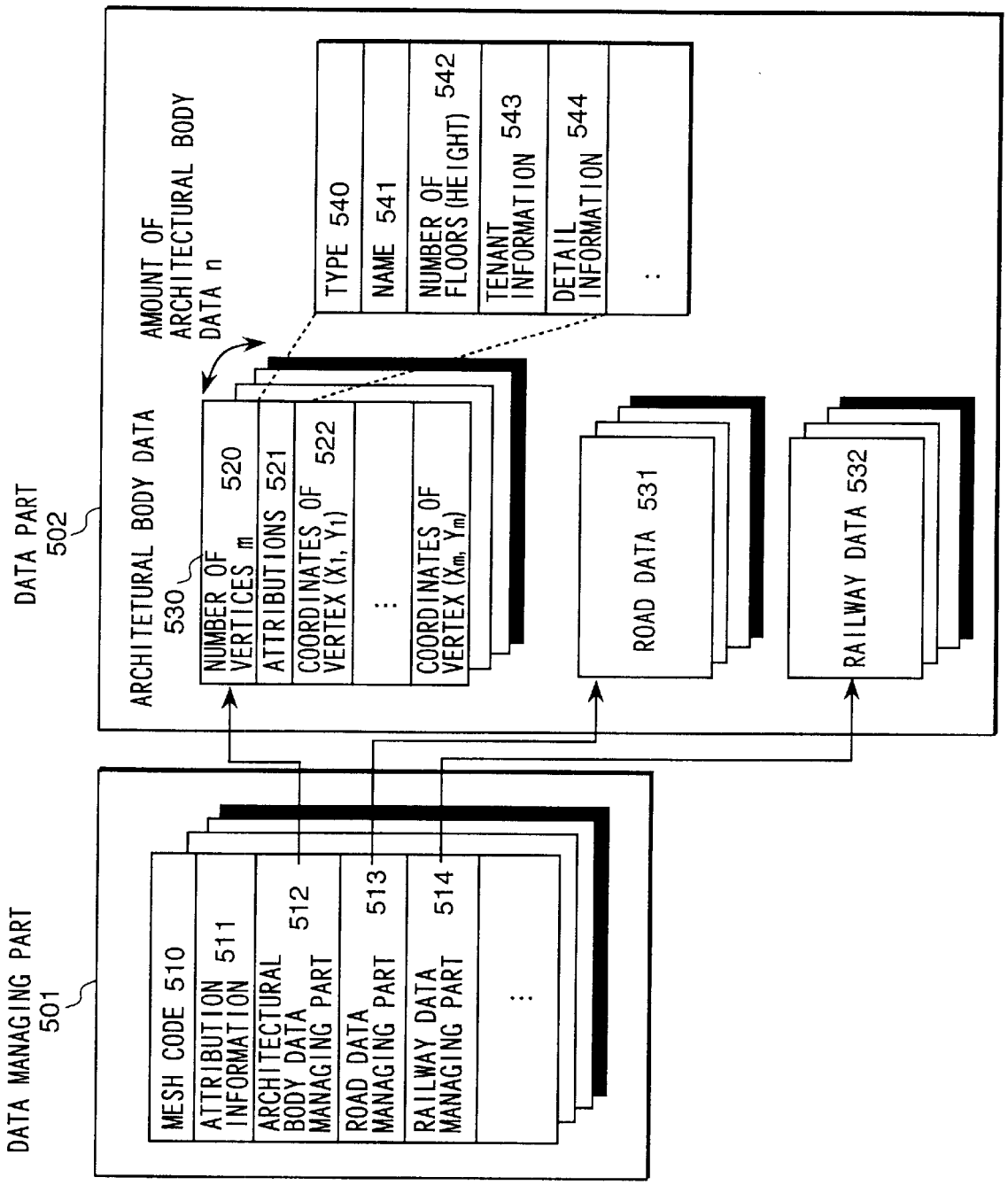
FIG. 5 is a block diagram depicting the data composition of the map database 3.

FIG. 5 shows an example of the data composition of the map database 3.

The map database 3 is composed of the data managing part 501 and the data part 502. Since a great amount of map data such as roads, buildings, etc., is stored in the map database 3, the map data are managed based on standard area meshes obtained by dividing the map into meshes with respect to longitudes and latitudes. Further, an identification number which is called a mesh-code is allocated to each area mesh.

The data managing part includes a management table for each mesh, and the management table further includes a mesh-code 510, attribution information 511, an architectural body data managing part 512, a road data managing part 513, a railway data managing part 514, which control management data for each map element in the mesh. The attribution information includes the reduction in scale for the map, the month and year in which the map data was created, a broader mesh-code, etc. Further, the architectural body data managing part 512 includes the amount of the architectural body data and the link data for linking other architectural body data to this architectural body data. In the same manner as the architectural body data managing part 512, the road data managing part 513 includes the amount of the road data and the link data for linking other road data to this road data, and the railway data managing part 514 includes the amount of the railway data and the link data for linking other railway data to this railway data.

The architectural body data 530 in the data part 502 are composed of the data of the number m of vertices 520 in each architectural body, attributions 521 of the architectural body, the coordinates 522 of each vertex, and soon. The attribution 521 of each architectural body include the type 540 of each architectural body such as an ordinary house, a gas station, a hotel, etc., the number of floors (or height) 542 of the architectural body, the name 541 of the architectural body such as "○○ hotel", "XX restaurant", etc., tenant information 543 for the architectural body, detail information 544 such as a baby room, a toilet, and so on. Here, the coordinates 522 of each vertex are the coordinates normalized in each mesh.

The road data 531 includes information for the links connecting intersections (hereafter, referred to as nodes), the coordinates of each node, the type of each road, such as a toll road, a national road, etc., the height of the road, and so on.

An example of the architectural body image-composing procedure according to the present invention, which is mainly used in the representation method-changing part 312 and the display processing part 311 shown in FIG. 3, is explained below with reference to the flow chart shown in FIG. 6.

When the current position determined by the current position calculating part 306 and the position correcting part 307 is renewed, or an instruction for changing the representation method, such as scrolling carried out by the user, changing of the view point, scale reduction, etc., is input via the command analyzing part 301, the display processing part 311 is instructed to renew of the displayed map image, and the above architectural body image-composing procedure is executed.

In the architectural body-image-composing procedure, the architectural body data is fist read out of the map database 3 in step 601, and the distance or level difference between the set view point and the architectural body is calculated in step 602. Here, if the architectural body possesses a plurality of vertices, a representative point of the vertices is determined, and the distance between the set view point and the representative point is calculated. On the other hand, if the level difference is calculated, this level difference can be obtained simply by calculating the difference between the height calculated based on the number of floors in the architectural body and the height of the view point, and it is not necessary to obtain such a representative point in the vertices.

Next, in step 603, the distance or level difference d calculated in step 602 is compared with a predetermined value L. In the comparison carried out in step 603, if the calculated distance or level difference d is larger than the predetermined value L, it is determined that it is necessary to change the representation method, and in step 608, the corresponding architectural body is displayed using a representation method with lower visibility or less detailed drawing performance than that used when displaying the stereoscopic shape of an architectural body, such as a plane shape (or bottom shape) display; a skeleton display in which an architectural body is displayed with its enclosure lines; a transparent display in which an architectural body is displayed with transparently lines connecting its vertices; or a display using a less conspicuous line-color, shape, or type. Further, in step 609, the architectural body is displayed with the changed representation method.

Here, although the architectural body is displayed with a representation method different from the stereoscopic method of displaying an architectural body if it is determined in step 603 that the calculated distance or level difference d is larger than the predetermined value L, it is conversely possible to change the representation method to another one that is different from the stereoscopic method of displaying an architectural body. With this display method, the difference between the region around the architectural body to be noticed and the other region can be clearly displayed, which can improve the guiding ability in a navigation processing function to which the above display method is applied.

For the architectural body for which it is determined in step 603 that the representation method will not be changed, in step 604, the three-dimensional shape data are created based on the read-out map data, an image of the architectural body is three-dimensionally composed using the three-dimensional shape data in step 605, and texture such as a window pattern is applied to the sides of the architectural body in step 606.

The composition of an image of each architectural body is performed according to steps 601–606 and steps 608–609 until images of all the architectural bodies in the designated area are composed.

Although the reference distance is preset in advance in this procedure, the reference distance can be optionally designated by the user via the user-input device, or it can be set corresponding to the position to be noticed which can is designated by the user or by the current position (of the car) obtained by the current position calculating part 306.

Another example of the process of changing the representation method for a displayed architectural body is explained below with reference to the flow chart shown in FIG. 7. Meanwhile, the same step numeral is attached to the same process in the flow chart show in FIG. 7 as that in the flow chart shown in FIG. 6, and the explanation of the process is omitted.

Figure 6:
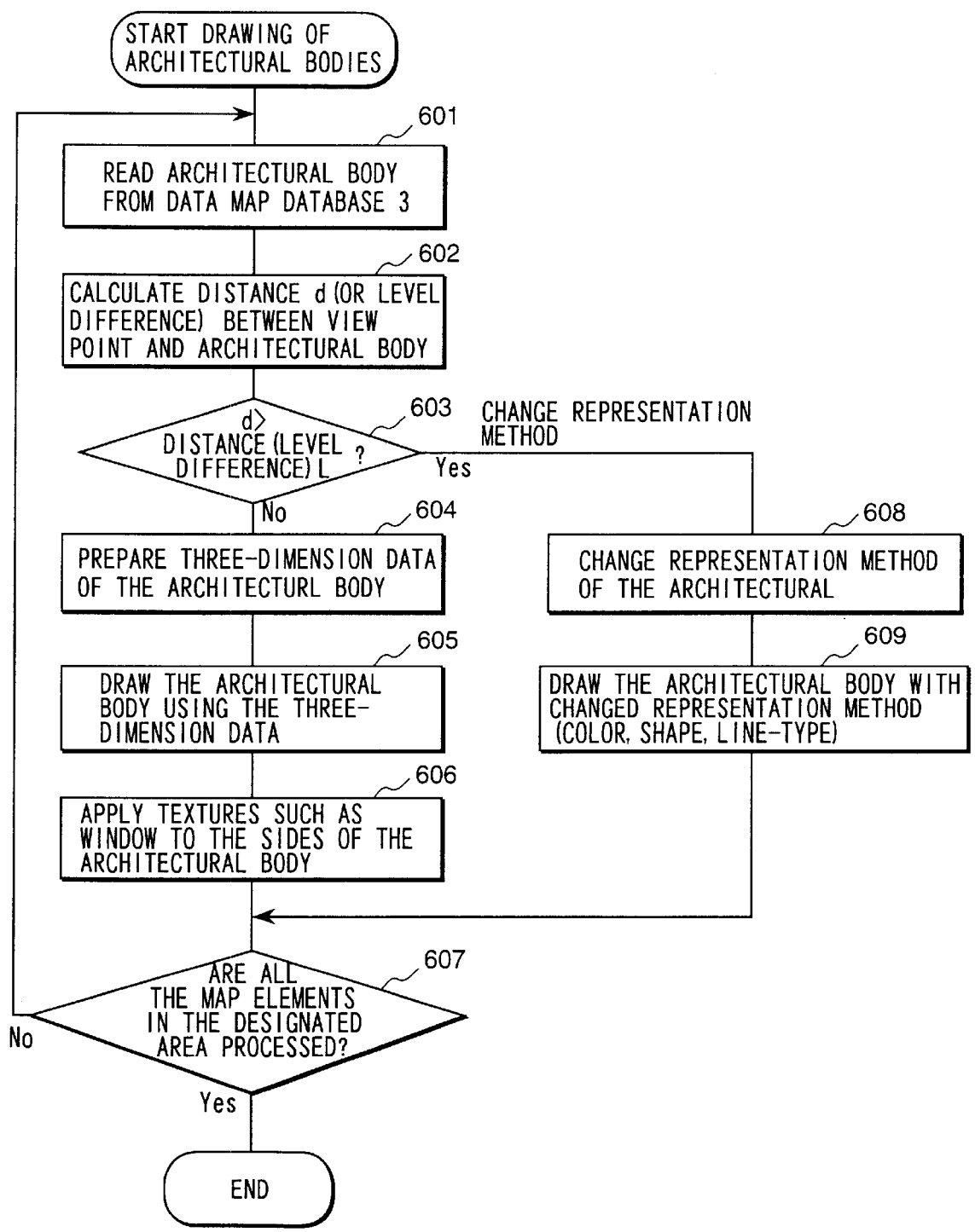
FIG. 6 is a flow chart showing an example of the processing of changing the representation method for a displayed architectural body, corresponding to the distance (or the level difference) between the view point and the displayed architectural body in the image-displaying process including the procedure of changing the representation method for a displayed architectural body, which relates to the present invention.

In this process, the condition of the height of the view point is added to the determination of whether or not the representation method for each architectural body is to be changed, which is performed in the procedure shown in FIG. 6.

In this way, the architectural body data 530 are read out of the map database 3 in step 601, and it is determined in step 601a whether or not the height of the view point is higher than a predetermined value. Further, if it is determined (the path of "yes" in step 601a) that the height of the view point is higher than the predetermined value, the same processes 602–609 as those in FIG. 6 are presented. Conversely, if it is determined (the path of "no" in step 601a) that the height of the view point is not higher than the predetermined value, the process goes to step 604, and all the architectural bodies are stereoscopically displayed.

When stereoscopically displaying architectural bodies, as the view point is raised, the number of architectural bodies to be displayed increases. On the other hand, according to the process 601a, since the representation method is changed only if the height of the view point is higher than a predetermined value, it is possible to display a part of the map elements with a plane shape, which reduces the displaying load.

Figure 7:
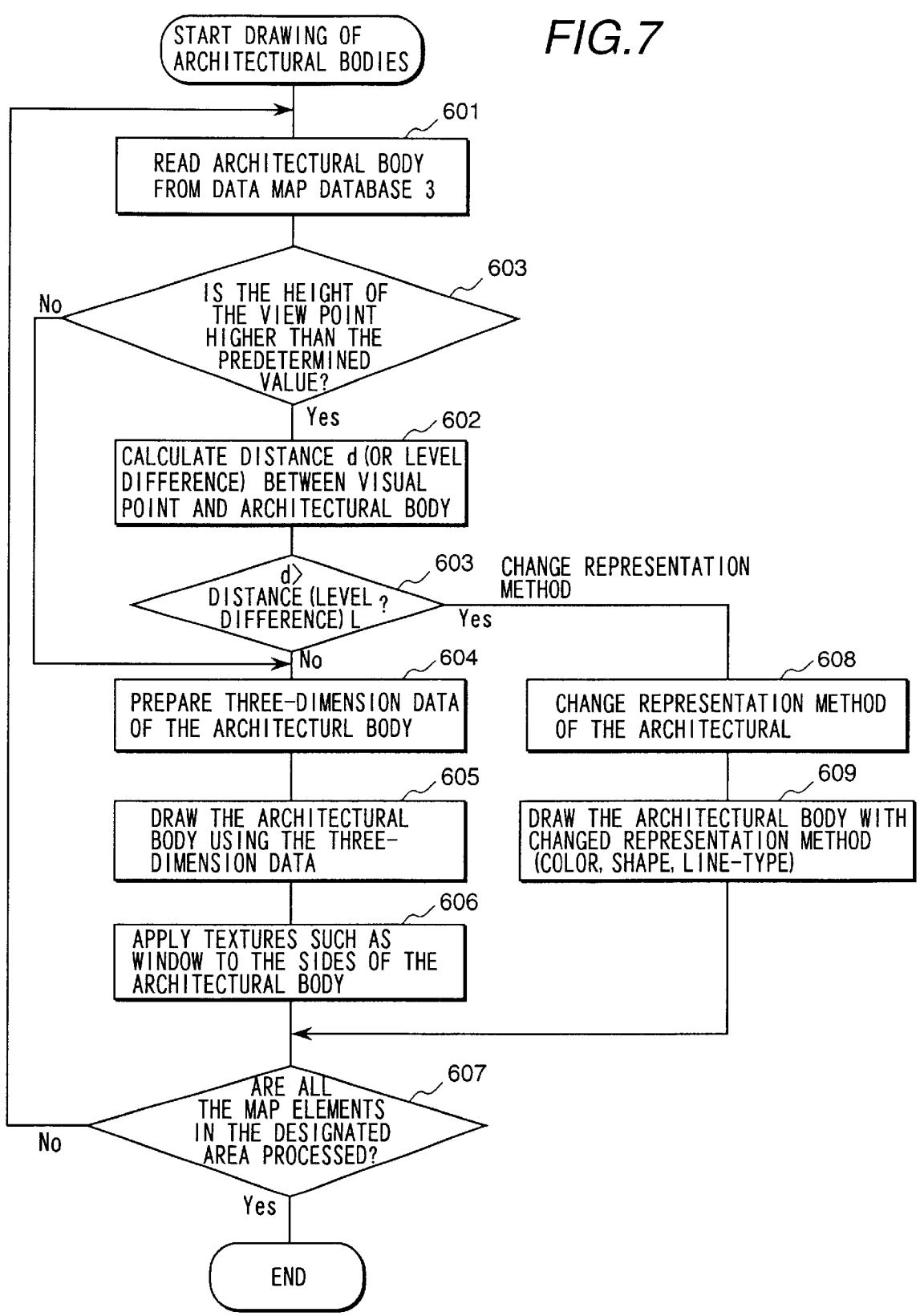
FIG. 7 is a flow chart showing another example of the process of changing the representation method for a displayed architectural body, corresponding to the distance (or the level difference) between the view point and the displayed architectural body in the image-displaying process including the procedure of changing the representation method for a displayed architectural body, which relates to the present invention.

FIGS. 8A and 8B are illustrations depicting examples of displayed images obtained by the process shown in FIG. 6 or FIG. 7.

In the example 801 of display shown in FIG. 8A, if it is determined in step 603 shown in FIG. 6 and FIG. 7 that the distance or level difference between the view point and the map element being larger than a predetermined value, the representation method for each map element is changed from a stereoscopic display to a plane-shape display. The mark 803 indicates the current position (of the car).

Since distant buildings are displayed with simple shapes in the example 801 of display, the scene around the car which the user wants to see are more clearly displayed.

On the other hand, in the example 802 of display shown in FIG. 8B, contrary to the branching based on the determination in step 603, the representation method for each element, the distance or level difference between the view point and the map element being smaller than a predetermined value, is changed from a stereoscopic display to a plane-shape display.

Since buildings in the region nearer the car are displayed with simple shapes in the example 802 of display, the scene around the road on which the car will move are more clearly displayed.

Another example of the process of changing the representation method for a displayed architectural body is explained below with reference to the flow chart shown in FIG. 9. Meanwhile, the same step number is attached to the same process in the flow chart shown in FIG. 9 as that in the flow chart shown in FIG. 6, and the explanation of the process is omitted.

In this example of display processing, the architectural body data 530 are read out of the map database 3 in step 601, and it is determined in step 602b whether or not the number of floor (height) in each architectural body, or the bottom area of the architectural body is larger than a predetermined value F, referring to the attributes 521 of the architectural body, such as the number 542 of floor, the coordinates of the vertices in the architectural body. In step 602b, if the number of floors (height) or the bottom area of the architectural body is smaller than the predetermined value F, in steps 608 and 609, the representation method for the architectural body is changed, for example, to a plane-shape display or a display using a transparent color.

Moreover, in this example of display-processing, in step 603b, it is determined whether or not each architectural body is one designated by the user or one to be noticed for guidance of the car, referring to the attributions 521 of the architectural body, such as the type 540, the tenant information 543, etc., described in the architectural body data 530 read out in step 601. In the step 603, if it is determined that the architectural body does not possesses the attributions designated by the user, or it should not be one to be noticed for guidance of the car because it is not located around the road on which the car will move, in steps 608 and 609, the representation method for the architectural body is changed, for example, to a plane-shape display or a display using a transparent color. Here, the architectural body to be noticed for guidance of the car is an architectural body designated by the user with a voice input or a touch-panel input, or an architectural body which the navigation system sets as one to be noticed, assuming that this architectural body will be used for guidance of this car.

Furthermore, although the representation method for the architectural body is changed to a representation method different from a stereoscopic display if it is determined in step 602b that the number of floors (height) or the bottom area of the architectural body is smaller than the predetermined value F, or if it is determined that the architectural body does not possesses the attributions designated by the user, or it should not be one to be noticed for guidance of the car because it is not located around the road on which the car will move, the display procedure of architectural bodies according to the present inventions is not restricted to the above examples.

For example, contrary to the above branching based on the determination in step 602, it is possible that if it is determined that the number of floors (height) or the bottom area of the architectural body is larger than the predetermined value, the process goes to step 608, and the representation method is changed to a representation method with a higher visibility or a higher detail degree with respect to its shape, color, texture, etc.

Further, contrary to the above branching based on the determination in step 603b, it is possible that if it is determined that the architectural body possesses the attributes designated by the user, such as a restaurant, a tea room, etc., and it may be an architectural body to be noticed for guidance of the car, the representation method is changed to a representation method with a higher visibility or a higher detail degree with respect to its shape, color, texture, etc.

Figure 9:
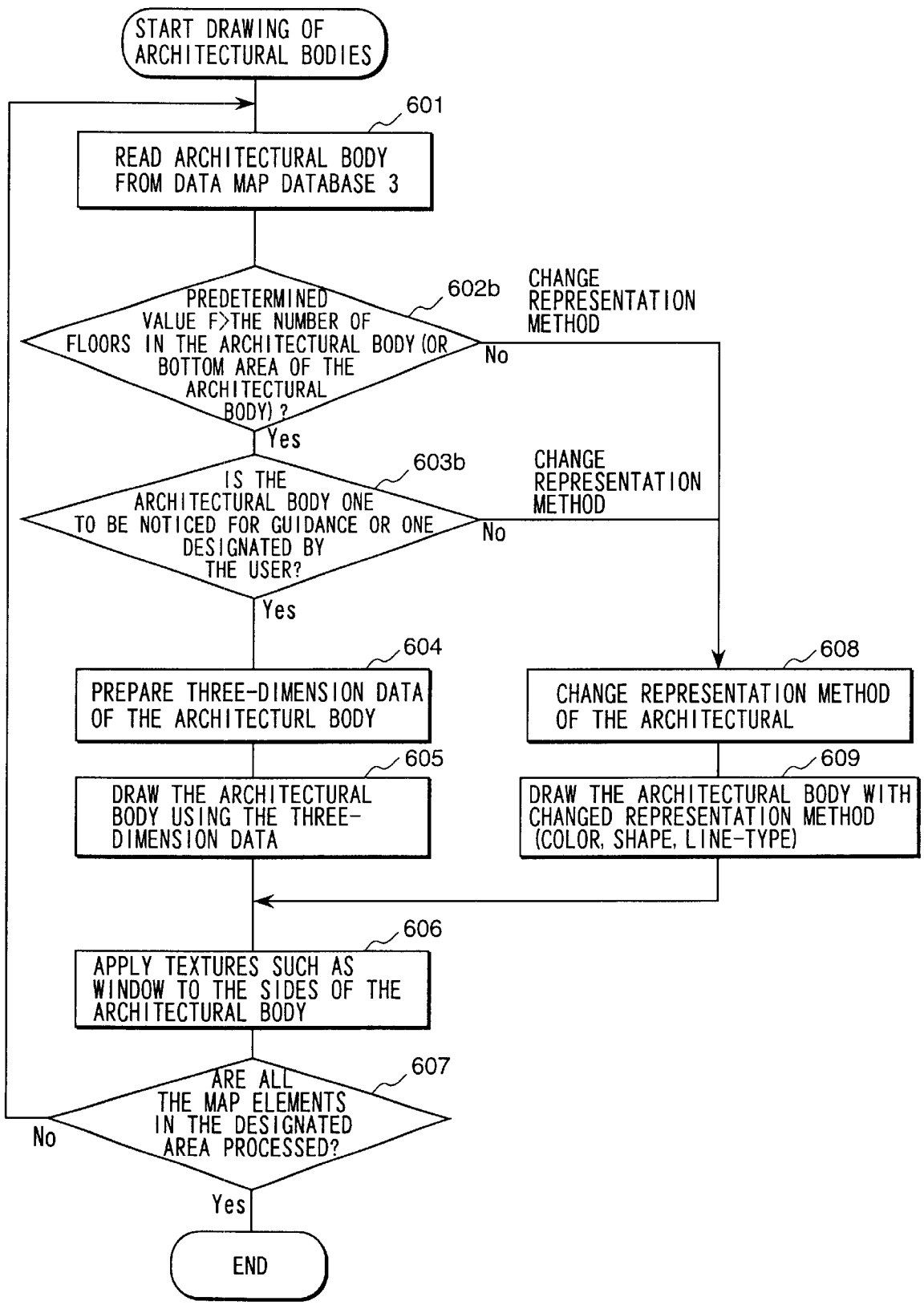
FIG. 9 is a flow chart showing an example of the process of changing the representation method for a displayed architectural body, corresponding to the attributes of the displayed architectural body in the image-displaying process including the procedure of changing the representation method for a displayed architectural body, which relates to the present invention.

Furthermore, it is possible to optionally combine the procedure shown in FIG. 9 with the procedure of changing the representation method to more improve the visibility or the drawing-detail degree.

Figure 10:
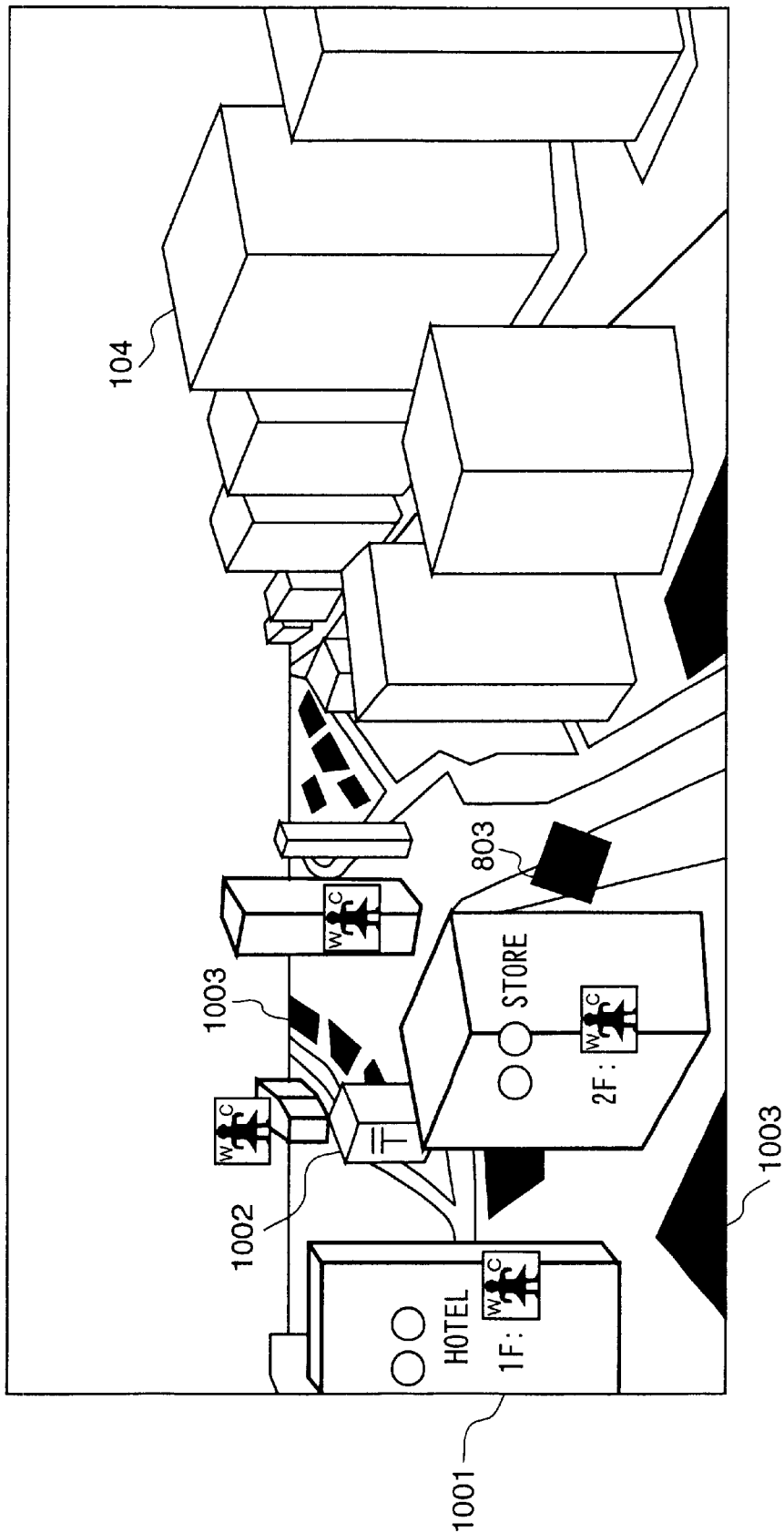
FIG. 10 is an illustration depicting an example of a displayed image obtained by the processing shown in FIG. 9.

FIG. 10 is an illustration depicting an example of a displayed image obtained by the process shown FIG. 9 and the processes added to the process, for improving the visibility or the drawing-detail degree.

In this example of display, when the user is seeking an available toilette around the car, the user inputs an attribute "toilette" via the user-input device 5. Consequently, in step 603b, locations at each of which a toilette is available are indicated to the user by changing color or the width of lines drawing the pertinent architectural bodies, or displaying a detail guidance such as "○○ hotel" (1001) with reference to the attribution of the type 540 or the detail information 544.

Also, it is possible to display a mark "i" on an image of a post office (1002), which is assumed as an architectural body to be noticed for guidance.

Furthermore, in the branching based on the determination in step 602b, it is possible to display the architectural body whose number of floors (height) or bottom area is smaller than a predetermined value, with a simple shape such as the plane shape (1003).

Another example of the process of changing the representation method for a displayed architectural body is explained below with reference to the flow chart shown in FIG. 11. Meanwhile, the same step number is attached to the same process in the flow chart show in FIG. 11 as that in the flow chart shown in FIG. 6, FIG. 7, and FIG. 9, and the explanation of the process is omitted.

Figure 11:
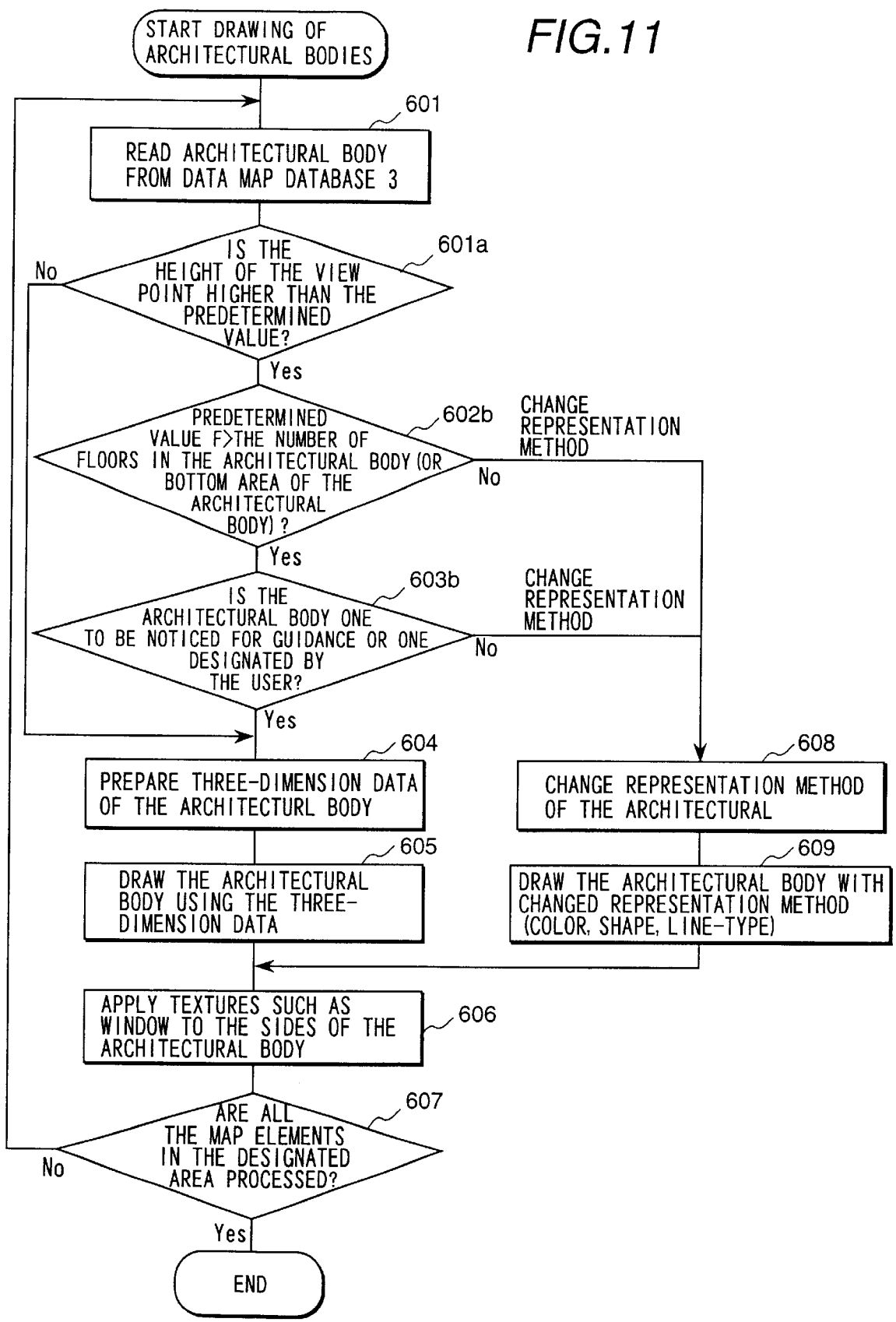
FIG. 11 is a flowchart showing an example of the process of changing the representation method for a displayed architectural body, corresponding to the height of the view point and the attributes of the displayed architectural body in the image-displaying process including the procedure of changing the representation method for a displayed architectural body, which relates to the present invention.

In this process, the height condition of the view point is added to the conditions used in the determination of whether or not the representation method for each architectural body is to be changed, which is performed in the procedure shown in FIG. 11. That is, it is determined in step 601a whether or not the height of the view point is higher than a predetermined value, and if the height of the view point is higher than the predetermined value, the steps on and after step 602b are executed.

In step 602b, it is determined whether or not the number of floors (height) or the bottom area of the architectural body is smaller than a predetermined value F, and if the number of floors (height) or the bottom area of the architectural body is smaller than the predetermined value F, the representation method for the architectural body is changed to a plane-shape display, a display using transparent color, etc.

Further, in step 602b, the following processes are also possible. That is, it is determined whether or not the number of floors (height) or the bottom area of the architectural body is larger than a predetermined value F, and if the number of floors (height) or the bottom area of the architectural body is larger than the predetermined value F, the representation method is changed to a representation method with higher visibility or higher drawing-detail degree with respect to its shape, color, texture, etc.

Next, it is determined in step 603b whether or not each architectural body is one designated by the user or one to be noticed for guidance of the car, referring to the attributions 521 of the architectural body such as the type 540, the tenant information 543, etc. In the step 603b, if it is determined that the architectural body does not possesses the attributions designated by the user, or it should not be one to be noticed for guidance of the car because it is not located around the road on which the car will move, the process goes to steps 608 and 609 so that the representation method for the architectural body is changed, for example, to a plane-shape display or a display using a transparent color.

Moreover, in step 603b, it is also possible that, if it is determined that the architectural body possesses the attributes designated by the user, such as a restaurant, a tea room, etc., or the architectural body is an architectural body to be noticed for guidance of the car, in steps 608 and 609, the representation method is changed by displaying a changed shape, color, texture, etc., of the architectural body.

In this embodiment, another example of the process of changing the representation method for a displayed architectural body is explained below with reference to the flow chart shown in FIG. 11 and FIG. 13. Meanwhile, the same step numeral is attached to the same process in the flow chart show in FIG. 12 as that in the flow chart shown in FIG. 6, FIG. 7, and FIG. 9, and the explanation of the process is omitted.

In this example, if it is determined in step 601a that the height of the view point is lower than a predetermined value, and it is further determined in step 602b whether or not the architectural body possesses the attributions designated by the user, or this architectural body is one to be noticed for guidance of the car, with reference to the attributions of the type 540 or the tenant information 543.

In the step 602b, if it is determined that the architectural body does not possesses the attributions designated by the user, or this architectural body should not be one to be noticed for guidance of the car because it is not located around the road on which the car will moves, the process goes to step 608, and the representation method for the architectural body is changed to a plane-shape display, a display using a transparent color, and so on.

Figure 13A:
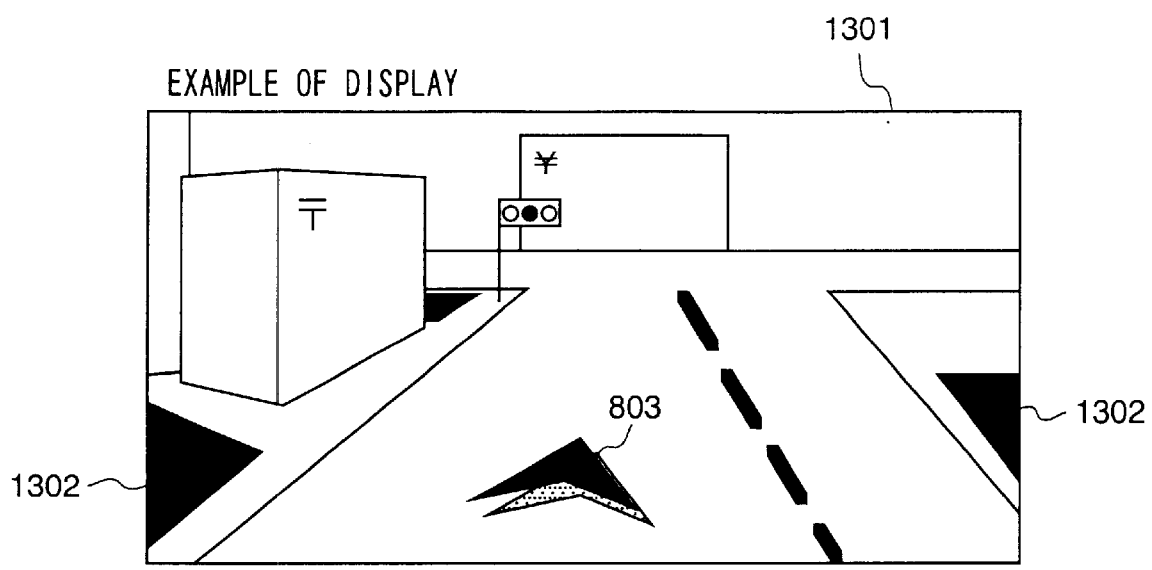
FIG. 13A is an illustration depicting an example of a displayed image obtained by the process shown in FIG. 12.

FIG. 13A shows an example of a displayed image obtained by the above process. In the example 1301 of display, the representation method for each architectural bodies 1302 which does not possesses the attributions designated by the user, or each architectural body 1302 which will not become one to be noticed for guidance of the car because it is not located around the road on which the car will moves, is changed to a simple-shape display such as a plane-shape display.

According to the example 1301 of display, ordinary houses are displayed with plane shapes, and public services such as a post office, stores, etc., which can be set as an architectural body to be noticed for guidance, are stereoscopically displayed.

Figure 12:
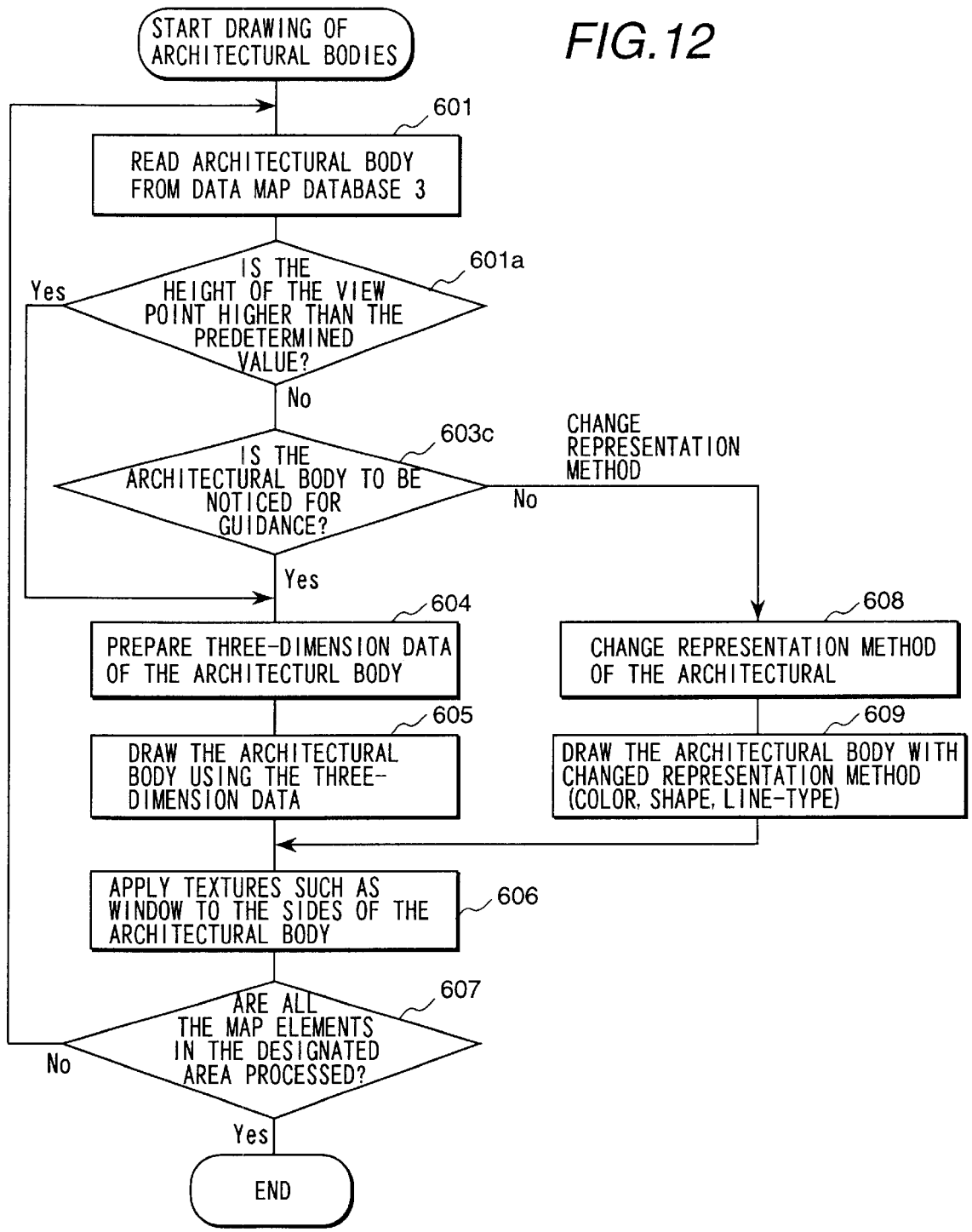
FIG. 12 is a flow chart showing another example of the process of changing the representation method for a displayed architectural body, corresponding to the height of the view point and the attributes of the displayed architectural body in the image-displaying process including the procedure of changing the representation method for a displayed architectural body, which relates to the present invention.

Moreover, it is possible that the representation method for pertinent architectural bodies is changed to the simple shape display such as that described above, but if it is determined in step 602b shown in FIG. 12 that the architectural body possesses the attributions designated by the user, such as a restaurant, a tea house, etc., or if it is determined that this architectural body should be one to be noticed for guidance, the representation method for this architectural body is changed by changing its detailed shape, color, texture, etc.

Figure 13B:
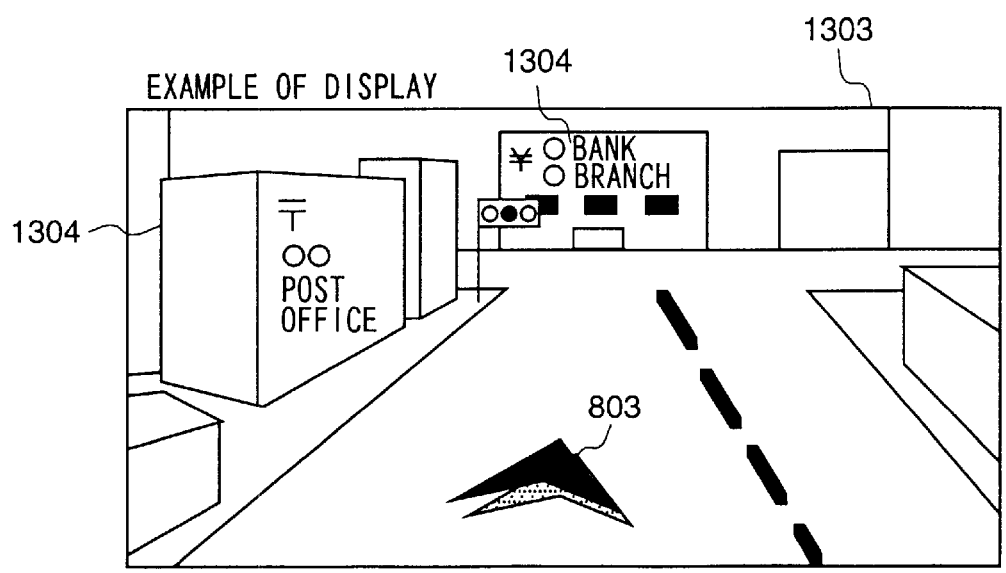
FIG. 13B is an illustration depicting another example of a displayed image obtained by the process shown in FIG. 12.

An example of display obtained based on the above changing method of the representation method is shown in FIG. 13B. In the example 1303 of display, the architectural bodies which possess the attributions designated by the user, or the architectural bodies to be notice for guidance, are more noticeably displayed by changing their detailed shapes, color, or texture.

According to the example 1303 of display, buildings which can be set as the architectural body to be noticed for guidance, such as a post office, a bank, etc., can be displayed more in detail than other architectural bodies.

Figure 14:
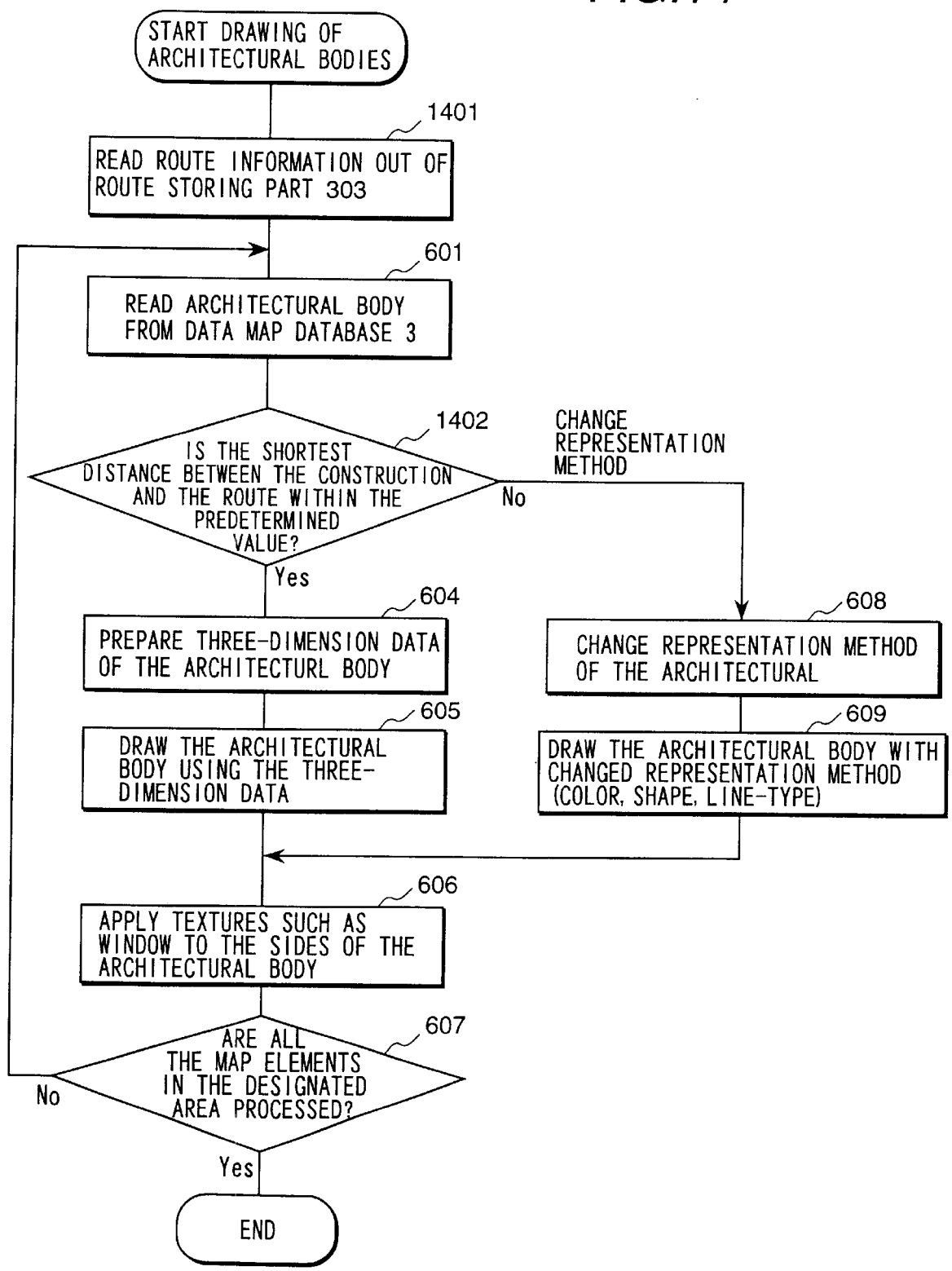
FIG. 14 is a flow chart showing further another example of the process of changing the representation method for displayed architectural bodies facing the road on which the moving body moves, or displayed architectural bodies located within a predetermined distance from the road.

In this embodiment, further another example of the process of changing the representation method for a displayed architectural body is explained below with reference to the flow chart shown in FIG. 14 and FIG. 15. Meanwhile, the same step numeral is attached to the same process in the flow chart show in FIG. 14 as that in the flow chart shown in FIG. 6, and the explanation of the process is omitted.

In this example, in step 1401, information on the route on which the car will move is read from the route storing part 303, and in step 602, the architectural body data are read out of the map database 3. Further, it is determined whether or not the relative distance (shortest distance) between the route and each architectural body is within a predetermined distance. If it is determined in step 2401 that the distance is longer than the predetermined distance, insteps 608 and 609, a representation method of the architectural body is changed to a plane-shape display or a transparent color display.

Figure 15:
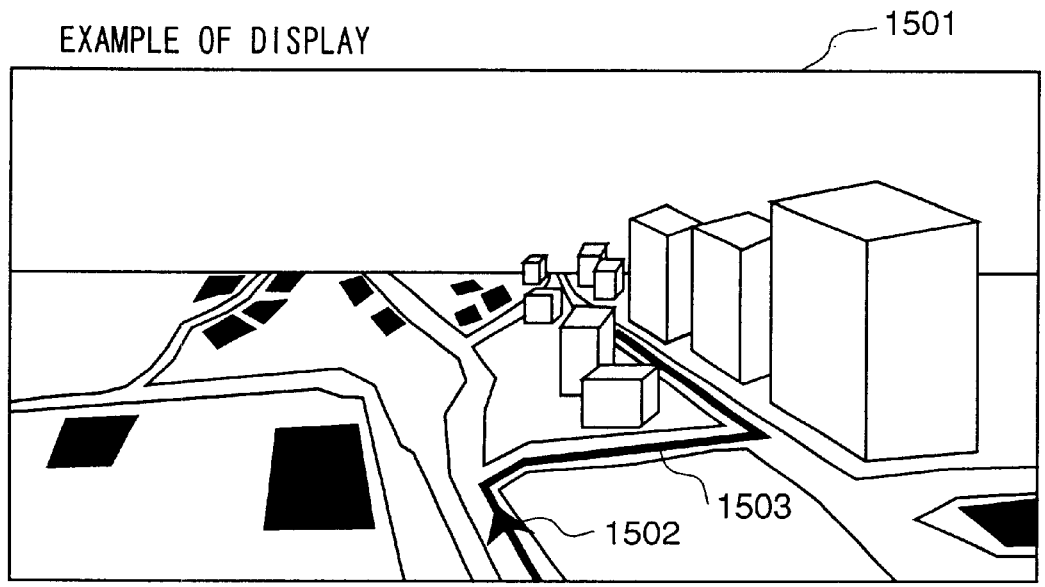
FIG. 15 is an illustration depicting an example of a displayed image obtained by the process shown in FIG. 14.

An example 1501 of display obtained based on the above changing method of the representation method is shown in FIG. 15. In the example 1501 of display, numerals 1502 and 1503 indicate a mark showing the current position of the car and the obtained route for the target location stored in the route storing part 303. With the example 1501 of display in which the architectural bodies facing the route or within a predetermined distance from the route are stereoscopically displayed, and the other ones are displayed with plane shapes, the architectural bodies near the route can be more noticeably displayed than other ones.

Figure 16:
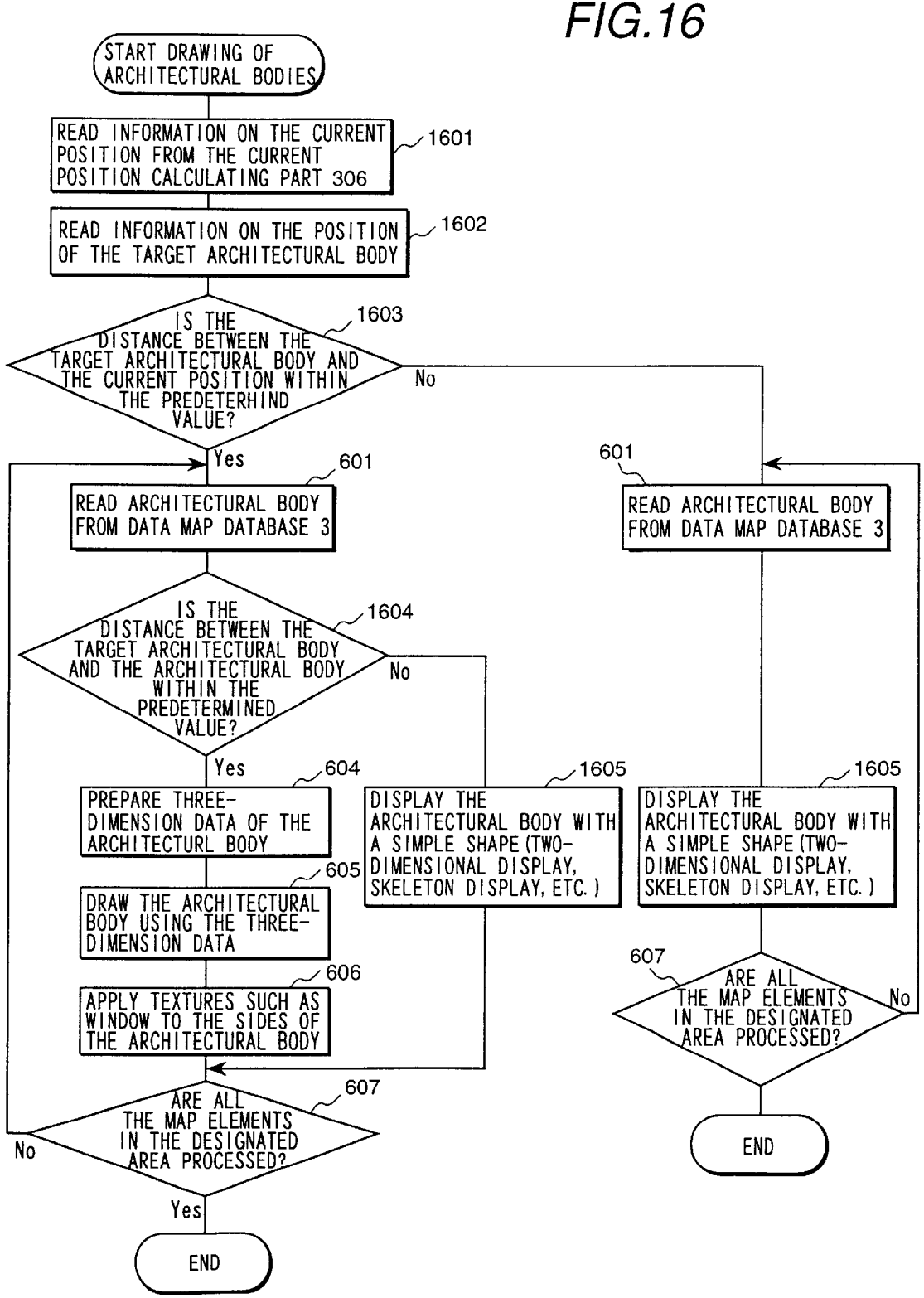
FIG. 16 is a flow chart showing further another example of the process of changing the representation method for displayed architectural bodies located within a predetermined distance from a target architectural body when the position of the moving body is within another predetermined distance from the target architectural body.

In this embodiment, further another example of the process of changing the representation method for a displayed architectural body is explained below with reference to the flow chart shown in FIG. 16 and FIG. 17. Meanwhile, the same step numeral is attached to the same process in the flow chart show in FIG. 16 as that in the flow chart shown in FIG. 6, and the explanation of the process is omitted.

In this example, in step 1601, information on the position of the car is read out of the current position calculating part 306, and, in step 1602, information on the position of the target architectural body is read out of the rout-memorizing part 303, on which the information is read out of the map database 3 and which is designated as a goal location or an architectural body to be noticed on the way to the target location. Further, it is determined in step 1603 whether or not the distance between the current position of the car and the target architectural body is shorter than a predetermined value, and if the distance is longer than the predetermined value, in step 1605, the architectural body on which the information is read out of the map database 3 is displayed with a simple shape such as a plane shape or a transparent color image. Conversely, if it is determined in step 1603 that the distance is within the predetermined value, it is further determined in step 1604 whether or not the distance between the architectural body on which the information is read out of the map database 3 and the target architectural body is shorter than another predetermined value. In step 1604, if the distance is longer than the predetermined value, in step 1605, the architectural body is displayed with a simple shape such as a plane shape or a transparent colored image. Conversely, in step 1604, if the distance is within the predetermined value, in steps 604–606, the architectural body is displayed with a noticeable shape (for example, a stereoscopic shape).

Figure 17:
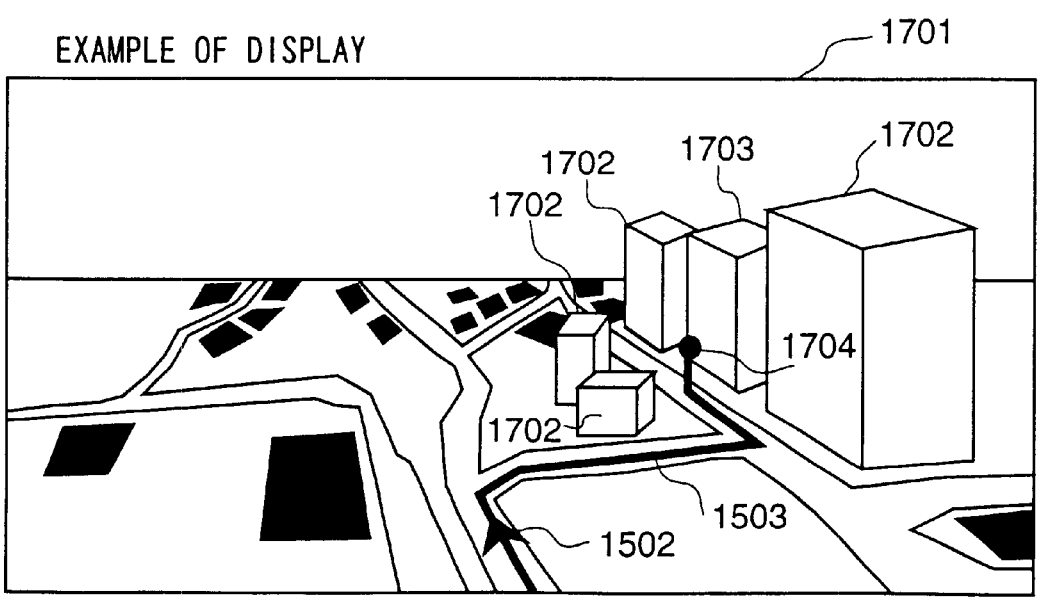
FIG. 17 is an illustration depicting an example of a displayed image obtained by the process shown in FIG. 16.

An example 1701 of display obtained based on the above changing method of the representation method is shown in FIG. 17. In the example 1701 of display, numerals 1703 and 1704 indicate the target architectural body and the goal location set for the target architectural body 1703, respectively. According to the example 1701, when the car 1501 approach the vicinity of the goal location 1704 (when the distance between the car and the target architectural body is within the predetermined distance), the architectural bodies neighboring the target architectural body can be displayed more in detailed than the other architectural bodies.

In accordance with the present invention, it is possible to provide a navigation apparatus or a stereoscopic map-display apparatus for displaying a stereoscopic scene viewed from a predetermined view point position, which is capable of suppressing the increase in the amount of information to be displayed due to the stereoscopic display of map elements, and reducing the image-displaying load.

What is claimed is:

1. A stereoscopic map-display method of displaying a scene on a display screen corresponding to a perspective map generated by viewing map elements in a displayed area which is set based on a position of a moving body or a position designated by a user, from a predetermined view point, said stereoscopic map display method comprising:

first reading map information of said map elements in said displayed area from a map database; and second using a representation technique which differs from a technique used to represent a remainder of map elements in said displayed area, for at least one of i) a specified group of said map elements, ii) a specified map element, and iii) a map element having specified attributes.

2. A stereoscopic map-display method according to claim 1, wherein said specified group is determined based on at least one of straight line distance, horizontal distance, and a level difference, between said view point and each map element.

3. A stereoscopic map display method according to claim 2, wherein, in said second step the representation technique, ones in said map elements for which at least one of the distance in a straight line, the horizontal distance, and the level difference, between each of said ones and said view point, is larger than a first threshold value, are displayed using a representation method with lower visibility or lower drawing-detail degree than that used when displaying the remainder of said map elements.

4. A stereoscopic map display method according to claim 2, wherein in said second step the representation technique, ones in said map elements for which, at least one of the distance in a straight line, the horizontal distance, and the level difference, between each of said ones and said view point, is smaller than a second threshold value, are displayed using a representation method with lower visibility or lower drawing-detail degree than that used when displaying the remainder of said map elements.

5. A stereoscopic map display method according to claim 2, wherein in said second step the representation technique, a representation technique for a map element is changed based on at least one of the distance in a straight line, the horizontal distance, and the level difference, between each of said ones and said visual, and the height of said view point.

6. A stereoscopic map display method according to claim 1, wherein in said second step the representation technique, ones in said map elements, which are located between said view point and a position to be noticed, said position being set in said displayed area, are displayed using a representation method with lower visibility or lower drawing-detail degree than that used when displaying the rest ones in said map element.

7. A stereoscopic map display method according to claim 1, wherein:

said attributes include at least one of a number of floors, height, and bottom area of an architectural body corresponding to said map element; and in said second step the representation technique, ones in said map elements for which at least one of said number of floors, said height, and said bottom area of said architectural body, is smaller than a third threshold value, are displayed using a representation method with lower visibility or lower drawing-detail degree than that used when displaying the remainder of said map elements.

8. A stereoscopic map display method according to claim 1, wherein:

said attributes include at least one of a number of floors, height, and bottom area of an architectural body corresponding to said map element; and in said second step the representation technique, ones in said map elements for which at least one of said number of floors, said height, and said bottom area of said architectural body, is larger than a fourth threshold value, are displayed using a representation method with higher visibility or higher drawing-detail degree than that used when displaying the remainder of said map elements.

9. A stereoscopic map display method according to claim 1, wherein:
control information for designating at least one of i) said specified group of said map elements, ii) said specified map element, and iii) said map element having specified attributes, is received from outside an apparatus which processes this method; and
ones in said map elements located in said displayed area, which are not designated by said control information, are displayed using a representation method with lower visibility or lower drawing-detail degree than that used when displaying ones designated by said control information in said map element.

10. A stereoscopic map display method according to claim 1, wherein control information for designating at least one of i) said specified group of map elements, ii) said specified map element, and iii) said map element with specified attributes, is received from outside an apparatus which processes this method; and
ones in said map elements in said displayed area, which are designed by said control information, are displayed by a representation method with higher visibility or higher drawing-detail degree than that used when displaying ones which are not designated by said control information in said map element.

11. A stereoscopic map display method according to claim 1, wherein in the second step the representation technique, said representation technique is changed based on the attributes of said map elements and said height of said view point.

12. A stereoscopic map display method according to claim 2, wherein in the second step the representation technique, the representation technique for each element whose representation method is changed, is changed to one of a wire display, a transparent display, and a plane-shape display.

13. A stereoscopic map display method according to claim 1, wherein in the second step the representation technique, each element, whose representation method is changed, is displayed by changing at least one of texture applied to said map element, a pattern applied to side faces of said map element, a shape of said map element, width of wires used to draw said map element, and guidance information attached onto said map element.

14. A stereoscopic map display method according to claim 12, wherein in the second step the representation technique, each element, whose representation technique is changed, is displayed by changing at least one of texture applied to said map element, a pattern applied to side faces of said map element, a shape of said map element, width of wires used to draw said map element, and guidance information attached onto said map element.

15. A stereoscopic map display method according to claim 1, wherein:
said specified group in said map elements is determined by selecting map elements from said map elements based on at least one of positional relationship between said view point and each of said map elements, and attributes each of said map elements; and
a representation method for said selected map elements is changed.

16. A stereoscopic map display method according to claim 1, wherein said specified group of said map element is determined by selecting at least one of a group of map elements facing a road on which said moving body moves and a group of map elements, the distance between each of said map element and said road being within a predetermined distance.

17. A stereoscopic map display method according to claim 16, wherein said representation technique for said specified group in said map elements is changed.

18. A stereoscopic map display method according to claim 1, wherein said specified group of map elements is a group which is located within a first predetermined distance from at target architectural body when the position of said moving body is within a second predetermined distance.

19. A navigation apparatus including position detection means for detecting a current position of a moving body, user-input means, display means for displaying a map of an area including at least one of said current position of said moving body and a position designated by a user, said navigation apparatus generating an image to be displayed, using said method according to claim 1.

* * * * *